United States Patent [19]

Dreon et al.

[11] Patent Number: 5,572,098
[45] Date of Patent: Nov. 5, 1996

[54] MOTOR VEHICLE ACCESSORY CONTROL WITH CONTROL MODULE HAVING SINGLE POWER TERMINAL

[75] Inventors: Michael J. Dreon, Utica, Mich.; Pierre Y. Abboud, Cortland, Ohio

[73] Assignee: General Motors Corporation, Detroit, Mich.

[21] Appl. No.: 561,564

[22] Filed: Nov. 22, 1995

Related U.S. Application Data

[63] Continuation of Ser. No. 269,486, Jul. 1, 1994, abandoned.

[51] Int. Cl.$^6$ ....................................................... B60L 1/00
[52] U.S. Cl. ............................. 318/293; 307/10.1; 70/279; 49/280
[58] Field of Search .................................... 318/280, 281, 318/287–291, 293, 283; 307/10.1; 70/262–264, 277, 279; 49/280

[56] References Cited

U.S. PATENT DOCUMENTS

| | | | |
|---|---|---|---|
| 4,203,039 | 5/1980 | Pritchard | 307/10.1 |
| 4,454,454 | 6/1984 | Valentine | 318/293 |
| 4,727,735 | 3/1988 | Haag et al. | 70/264 |
| 4,809,121 | 2/1989 | Nehls | 361/1 |
| 4,896,084 | 1/1990 | Maue et al. | 318/280 |
| 5,111,902 | 5/1992 | Sundeen et al. | 180/281 |
| 5,248,898 | 9/1993 | Periou | 307/10.1 |
| 5,250,849 | 10/1993 | Periou | 307/10.1 |
| 5,263,762 | 11/1993 | Long et al. | 296/146.4 |
| 5,369,306 | 11/1994 | Dib | 307/10.1 |
| 5,406,274 | 4/1995 | Lambropoulos et al. | 340/825.69 |

OTHER PUBLICATIONS

1994 U–Van Platform Service Manual, copyright Jul. 1993, pp. 8A–131–0 to 8A–131–5 and title page.

*Primary Examiner*—Brian Sircus
*Attorney, Agent, or Firm*—Robert M. Sigler

[57] ABSTRACT

A motor vehicle accessory control is capable of reversibly activating a DC motor to operate a vehicle door lock, window, sun roof or similarly operated device through a relay controlled H-switch arrangement. The control is provided with an automatic control circuit in a module having input and output terminals but only a single power terminal, which provides either positive power or ground to the module. The opposite power connections are made from the module through the activating relay coils of the H-switch motor drive circuit. A manual switch may be provided for alternative manual reversible activation of the relays; and the circuit provides priority of manual over automatic operation. Neither the manual switch nor the module circuit is capable of activating both relays simultaneously; therefore, a reliable power connection is always available for the module through at least one of the relay activating coils.

8 Claims, 2 Drawing Sheets

5,572,098

MOTOR VEHICLE ACCESSORY CONTROL WITH CONTROL MODULE HAVING SINGLE POWER TERMINAL

This is a continuation of application Ser. No. 08/269,486 filed on 1 Jul. 1994, now abandoned.

BACKGROUND OF THE INVENTION

This invention relates to the control of motor vehicle accessories, particularly those, such as power door locks, windows sun roofs, hidden headlight activators or the like, which include a DC electric motor activatable reversibly through a relay controlled H-switch arrangement. Such a control may also include a control module having a module logic circuit providing automatic control of the accessory in response to sensed vehicle actions or conditions; and the module requires input and output terminals connected by wires in the vehicle wiring harness to input signal generating devices, motor control relays and the source of electric power. The latter connections are generally made to B+ and ground busses in the vehicle wiring harness through two module power terminals.

SUMMARY OF THE INVENTION

The control of this invention eliminates one of the module terminals of prior art controls by providing DC electric power to the module through a single module power terminal and through the output terminals to the motor control relay activating coils. Since the electric motor in such accessories is only activated in one direction at a time, one of the motor control relay activating coils will always provide a reliable vehicle power supply connection. Further details and advantages of this invention will be apparent from the accompanying drawings and following description of a preferred embodiment.

DESCRIPTION OF A PREFERRED EMBODIMENT

Figure 1:
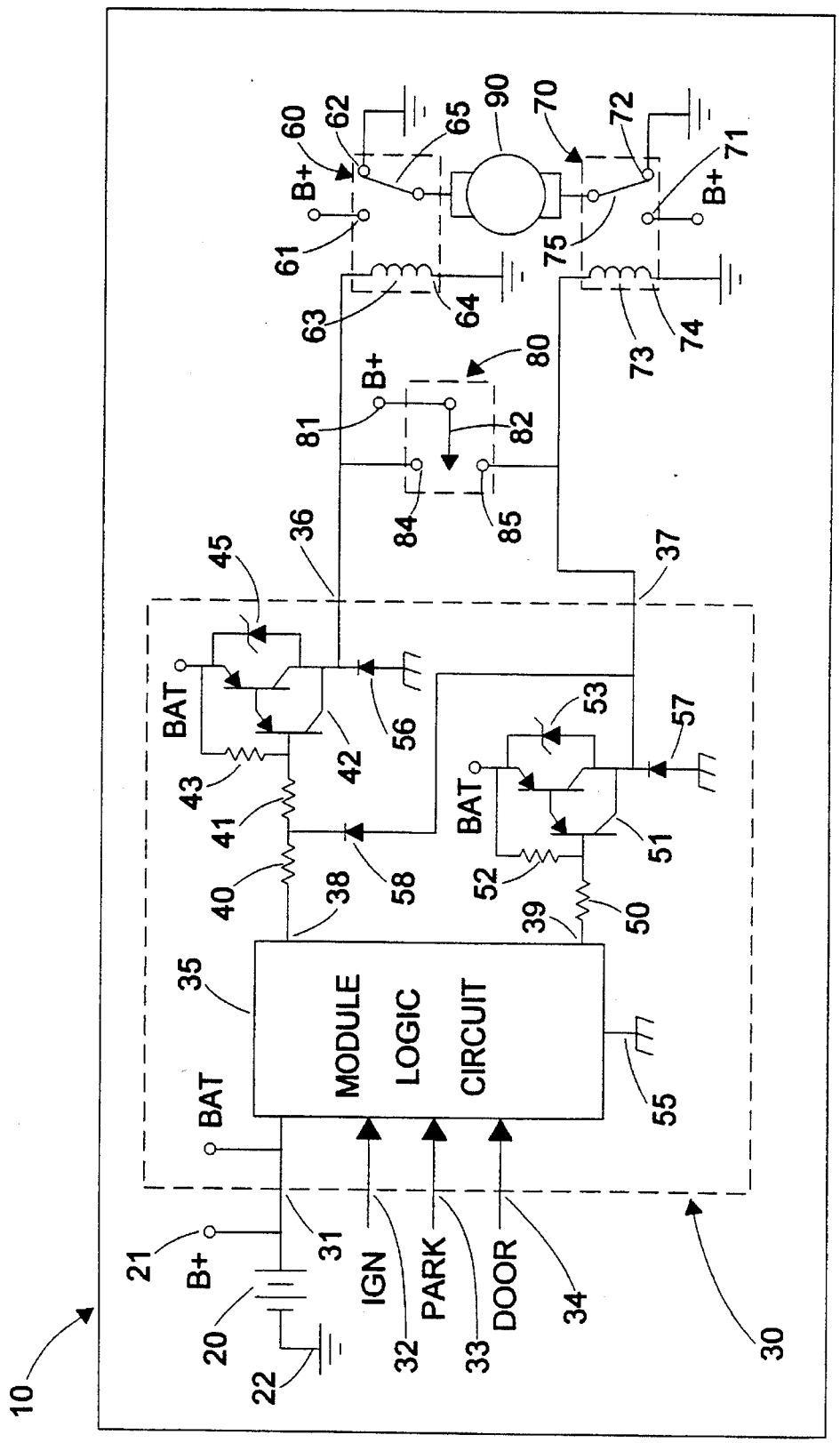
FIG. 1 is a circuit diagram of a motor vehicle having an accessory with a control according to this invention.

A first embodiment of this invention is shown in the circuit diagram of FIG. 1. Motor vehicle 10 has a DC electric power supply represented by battery 20, which provides B+ volts between a B+ terminal 21 and a ground terminal 22. B+ terminal 21 is connected through the vehicle wiring harness to an input power terminal 31 of a door lock control module 30, the normally open contact 61 of a lock relay 60, the normally open contact 71 of an unlock relay 70 and the armature 81 of a manual door lock switch assembly 80. Ground terminal 22 of battery 20 is connected through the vehicle wiring harness to the normally closed contact 62 of lock relay 60, the normally closed contact 72 of unlock relay 70, one end 64 of activating coil 63 of lock relay 60 and one end 74 of activating coil 73 of unlock relay 70. Ground terminal 22 of battery 20 is not connected directly to any terminal of door lock control module 30: indeed, no such dedicated ground terminal is provided in module 30.

Relay 60 further comprises an armature 65; and relay 70 further comprises an armature 75. A DC electric motor 90 comprises an armature connected between armature 65 of relay 60 and armature 75 of armature 70 in a standard relay H-switch arrangement so that, with both relays deactivated, each of the armature terminals of motor 90 are grounded. Although only one motor 90 is shown, additional motors— one for each vehicle door lock—would be connected in parallel therewith. Activation of relay 60 connects the armatures of motor 90 and any parallel connected motors across the terminals of battery 20 to provide motor armature rotation in direction to lock the vehicle doors. Alternatively, activation of relay 70 connects the armatures of motor 90 and any parallel connected motors across the terminals of battery 20 in the opposite direction to provide motor armature rotation in the opposite direction for unlocking the vehicle doors.

Door lock control module 30 comprises an electronic circuit board in an insulating case, not shown. Module 30 provides electrical connection between the internal electronic circuit board and external electrical wiring via terminals which may be arranged in the normal manner to accept one or more wiring harness plug connectors for making the required electrical connections. Input power terminal 31, already mentioned, provides connection between the B+ terminal 21 of battery 20 and a module positive power distribution bus BAT on the circuit board within module 30, which bus thus provides voltage B+ to a module logic circuit 35 and other devices within the module yet to be described. A plurality of input terminals 32-34 receive electrical input signals from external sensing devices on the vehicle, which are not specifically shown herein. In particular, an IGN signal is received from the vehicle ignition system on input terminal 32 and indicates the on/off status of thereof; a PARK signal is received from the vehicle transmission and indicates the park/drive status thereof; and a DOOR signal is received from a vehicle door operated switch and indicates the open/closed status thereof. Module 30 further comprises a lock output terminal 36 and an unlock output terminal 37, to be described in more detail below.

Module logic circuit 35 receives inputs IGN, PARK and DOOR and determines, when certain combinations of these signals occur, to provide a lock pulse on a line 38 or an unlock pulse on a line 39, in each case typically by the switching action of a comparator having a standard transistor collector output. Module logic circuit 35 is well known in the prior art on vehicles produced by the assignee of this applications. It comprises a circuit responsive to the shifting of the vehicle transmission out of PARK into DRIVE with the ignition on and the driver door closed to generate a pulse signal which, when applied through a driver transistor to the lock relay of an H-switch motor drive circuit, produces locking of all vehicle doors, and likewise responsive to the shifting of the vehicle transmission out of DRIVE into PARK to generate a signal which, when applied through a driver transistor to the unlock relay of the H-switch motor drive circuit, produces unlocking of the vehicle doors. The structure and operation of this circuit are known in the prior art and need not be shown or described in detail herein. In any event, the particular circuit is not important to this invention except for its ability to provide a pulse signal on either of lines 38 and 39 and the requirement, for its operation, of a circuit path to B+ terminal 21 and another circuit path to ground terminal 22 of battery 20.

Line 38 is connected through series resistors 40 (6.2K) and 41 (6.2K) to the base of a PNP Darlington transistor 42 having an emitter connected to module positive power distribution bus BAT, through a resistor 43 (6.2K) to its base and through a protective Zener diode 45 to its collector. The collector of transistor 42 is also connected to lock output terminal 36 and, therethrough, to the other end of activating coil 63 of lock relay 60. Similarly, line 39 is connected through a resistor 50 (20K) to the base of a PNP Darlington transistor 51 having an emitter connected to module positive power distribution bus BAT, through a biasing resistor 52 (6.2K) to its base and through a protective zener diode 53 to its collector. The collector of transistor 51 is connected to unlock output terminal 37 and, therethrough, to the other end of activating coil 73 of unlock relay 70. A diode 58 is connected from unlock output terminal 37 to the junction of resistors 40 and 41.

Module 30 comprises a module ground power distribution bus 55, shown at module logic circuit 35, which is also connected through a diode 56 to lock output terminal 36 and through a diode 57 to unlock output terminal 37. All devices in module 30 requiring ground connection, including those in module logic circuit 35 as well as transistors 42 and 51, thus receive ground connection through one or both of relay coils 63 and 73. If relays 60 and 70 cannot be simultaneously activated, a ground connection will always be provided to module ground power distribution bus 55 through at least one of coils 63 and 73. The current requirements of module logic circuit 35 are insufficient to activate either of relays 60 and 70; only the drive transistors 42 and 51 have that capability.

Manual lock switch 80 comprises an armature 82, as well as normally open contacts 84 and 85, with contact 84 connected to lock output terminal 36 of module 30 and contact 85 connected to unlock output terminal 37 of module 30. Armature 82 of manual switch 80 is normally held separate from contacts 84 and 85 by a built in spring apparatus but may be temporarily moved into contact with lock contact 84 for manual power locking of all vehicle door locks or with unlock contact 85 for manual power unlocking thereof, by means of relays 60 and 70, respectively. Manual switch 80 is normally provided for convenient activation by the vehicle driver; however, additional manual switches may be connected in parallel therewith and located for convenient activation by one or more vehicle passengers.

In operation, when neither relay is activated, the collector of transistor 42 is grounded to battery 20 through relay coil 63, the collector of transistor 51 is grounded to battery 20 through relay coil 73, and module logic circuit 35 is grounded to battery 20 through module ground power distribution bus 55, diodes 56 and 57 and relay coils 63 and 73. The ground voltage level in module logic circuit 35 will float somewhat above that of battery 20, due to the voltage drops across the diodes and coils; but a normal power supply circuit within module logic circuit 35 can maintain an operating voltage less than B+ a constant level above the local ground; and circuit performance will not be negatively affected.

The generation of a lock pulse on line 38 by module logic circuit 35 turns on transistor 42 to activate relay 60 and thus connect motor 90 across battery 20 to turn in direction to lock the associated vehicle door, the pulse being sufficiently long to drive the lock mechanism to its locked position. Battery voltage thus appears across relay coil 63 and reverse biases diode 56. Module logic circuit 35, however, is still grounded through module ground power distribution bus 55, diode 57 and relay coil 73. Likewise, the generation of an unlock pulse on line 39 by module logic circuit 35 turns on transistor 51 to activate relay 70 and thus connect motor 90 across battery 20 to turn in the opposite direction to unlock the associated vehicle door. In this case, relay coil 73 reverse biases diode 57; however, module logic circuit 35 is still grounded through module ground power distribution bus 55, diode 56 and relay coil 63. Neither module logic circuit 35 nor manual switch 80 is capable of activating transistors 42 and 51 simultaneously; and the circuit will thus always be grounded through at least one of relay coils 56 and 57.

In addition, the apparatus provides operator priority. If manual switch 80 is activated to its UNLOCK position, a high voltage is provided through diode 58 to the base of transistor 42; and this voltage will override any lock pulse on line 38 to end or prevent activation of lock relay 60. Although not necessary in this embodiment as described, diode 58 will also perform this override function in favor of line 39 if both lines 38 and 39 were activated simultaneously by module logic circuit 35.

Figure 2:
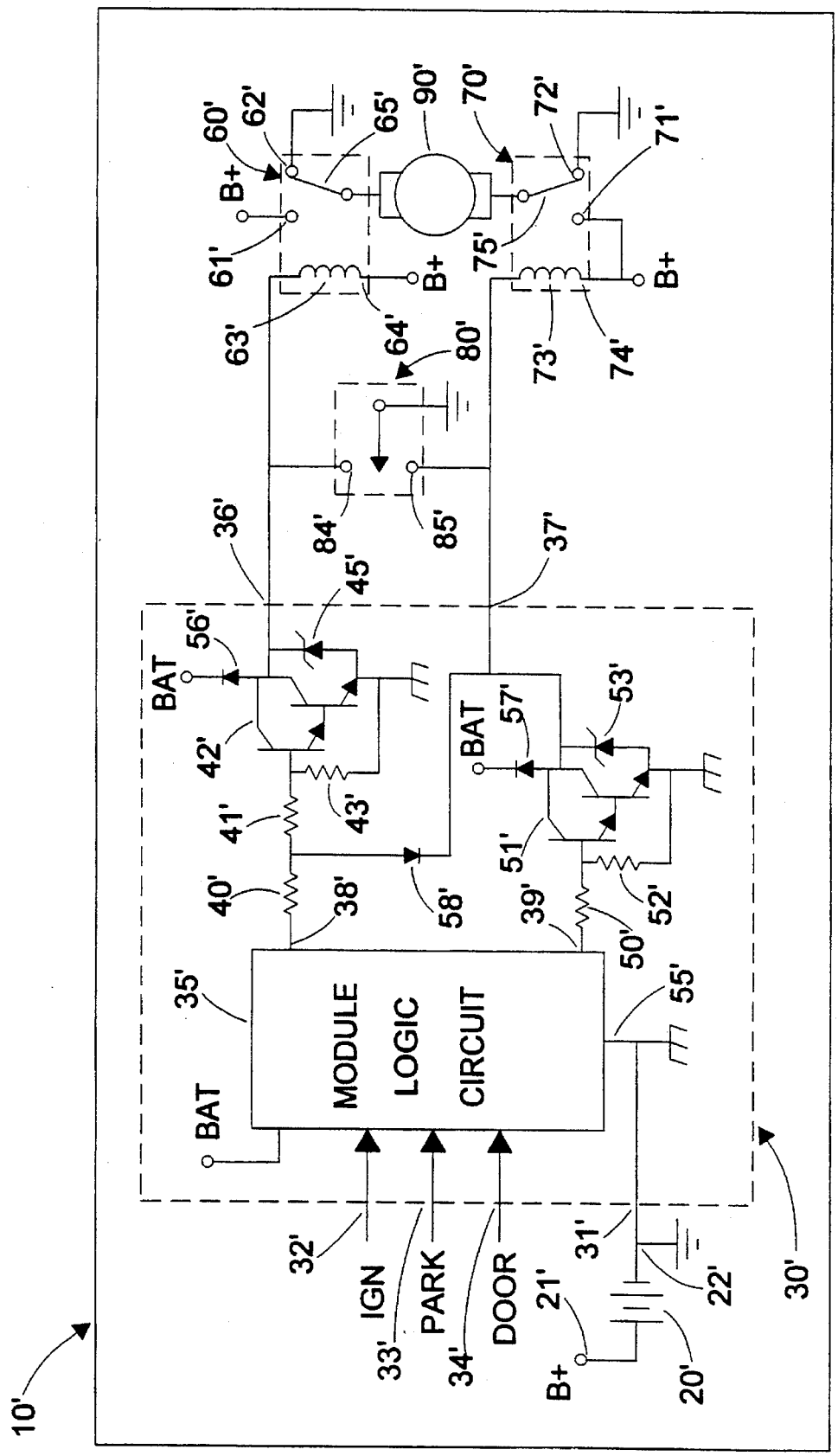
FIG. 2 is a circuit diagram of a motor vehicle with an alternative embodiment of a control according to this invention.

FIG. 2 shows an alternative embodiment similar to that of FIG. 2, except that the B+ connection to the module is made through the relay coils while ground is provided through a dedicated terminal to the module. Corresponding parts of the circuits are assigned similar but primed reference numbers. In vehicle 10' of FIG. 2, ground terminal 22' of battery 20' is connected through input power terminal 31' of module 30' to module ground power distribution bus 55', which provides a ground connection for all elements of module logic circuit 35' and NPN Darlington transistors 42' and 51'. The embodiment of FIG. 2 provides no dedicated positive power terminal to module 30'. Rather, one end 64' of relay coil 63' and one end 74' of relay coil 73' are each connected to B+. Diode 56' is connected from module lock output terminal 36' to module positive power distribution bus BAT, and diode 57' is connected from module unlock output terminal 37' to module positive power distribution bus BAT. Thus, the positive power connections are made from B+ terminal 21' of battery 20' to transistors 42' and 51' as well as module logic circuit 35' in a manner analogous to that of the ground connections in the embodiment of FIG. 1. Also, analogously with the circuit of FIG. 1, diode 58' prevents activation of transistor 42' when an unlock signal appears at unlock output terminal 37', due either to activation of manual switch 80' or activation of transistor 51'.

We claim:

1. A motor vehicle accessory control comprising, in combination:

a source of DC electric power in the vehicle having first and second terminals;

a DC electric motor for the accessory having motor armature terminals;

first and second relays each having a relay armature connected to one of the motor armature terminals and normally open and normally closed terminals connected to the first and second terminals of the source of DC electric power in an H-switch arrangement for selectively and reversibly powering the DC electric motor to activate the accessory selectively in either of two modes, the first and second relays each further having an activating coil, one end of each coil being connected to the second terminal of the DC electric power source;

a control module comprising a module logic circuit and first and second output semiconductor switches in an insulating package, the control module having a plurality of terminals for providing input electric signals of vehicle conditions from external sensing devices to the module logic circuit therein, only a single power terminal, which connects the module logic circuit therein to the first terminal of the DC electric power source, and first and second output terminals, the first and second output semiconductor switches being connected to control electric current flow between the single power terminal and the first and second output terminals, respectively, in response to the module logic circuit, the module logic circuit being effective to selectively render one, the other, or neither, but not both, of the first and second output semiconductor switches conducting, the first and second output terminals being connected to the other end of the relay coils of the first and second relays, respectively; and the module logic circuit having a first power distribution conductor connected to the power terminal and a second power distribution conductor connected through unidirectional current devices to each of the first and second output terminals so as to provide, through the relay coils, a connection between the module logic circuit and the second terminal of the DC power source.

2. The motor vehicle accessory control of claim 1 in which the second terminal of the DC power source is the vehicle ground.

3. The motor vehicle accessory control of claim 1 in which the vehicle accessory is a power door lock control.

4. The motor vehicle accessory control of claim 1 further comprising a feedback circuit from the second output terminal to the first output semiconductor switch so as to render the semiconductor switch non-conducting, regardless of the module logic circuit, when the second output semiconductor switch is conducting.

5. The motor vehicle accessory control of claim 1 further comprising a manual switch assembly having an armature connected to the first terminal of the DC power source, the armature being normally disconnected but being manually activatable alternatively to a first manual switch contact connected to the first output terminal or a second manual switch contact connected to the second output terminal.

6. The motor vehicle accessory control of claim 5 in which the second terminal of the DC power source is the vehicle ground.

7. The motor vehicle accessory control of claim 5 in which the vehicle accessory is a power door lock control.

8. The motor vehicle accessory control of claim 5 further comprising a feedback circuit from the second output terminal to the first output semiconductor switch so as to render the semiconductor switch non-conducting, regardless of the module logic circuit, when the second output semiconductor switch is conducting.

* * * * *